Feb. 20, 1923.

M. KESSLER

FILTER

Filed Sept. 2, 1921                 2 sheets-sheet 1

1,446,187

Inventor.
Max Kessler.

Feb. 20, 1923.
M. KESSLER
FILTER
Filed Sept. 2, 1921

Inventor.
Max Kessler.

Patented Feb. 20, 1923.

1,446,187

UNITED STATES PATENT OFFICE.

MAX KESSLER, OF MANNHEIM, GERMANY.

FILTER.

Application filed September 2, 1921.  Serial No. 497,944.

*To all whom it may concern:*

Be it known that I, MAX KESSLER, a citizen of the Republic of Bavaria, Germany, and a resident of Mannheim, Germany, have invented certain new and useful Improvements in Filters (for which I have filed applications in Germany Dec. 27, 1919, in Austria April 21, 1920, and in Hungary Apr. 28, 1920); and I do hereby declare the following to be a full, clear, and exact description of the invention, such as will enable others skilled in the art to which it appertains to make and use the same, reference being had to the accompanying drawings and to letters or figures of reference marked thereon, which form a part of this specification.

My invention relates to filters and more particularly to the ribbed inlet and discharge plates thereof, that alternate with the filtering elements, usually constructed in superposed arrangement.

The object of the invention is a construction of such plates to readily and effectually vent the air separated from the liquid being filtered, said air collecting at the surfaces of such plates. The plates are ribbed preferably on both sides, the spaces between the ribs forming liquid circulation channels that carry also the air, there being provided also an air venting channel or channels that collect and discharge the air either at the center of the plate or at its periphery to insure proper leading off of the air.

Referring to the drawings in which like parts are similarly designated:

Figure 1:
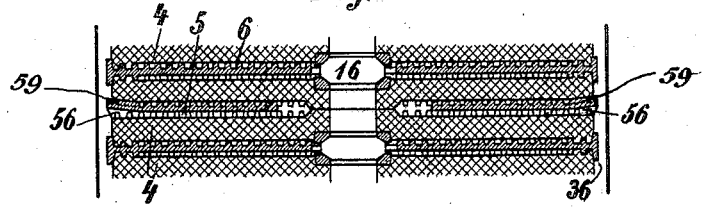
Figure 1 shows a vertical section on line A—B Figs. 2 and 3 of a portion of a filter with the plates in operative position.

As will be seen from Figure 1 the filtering layers 4 alternate with the ribbed inlet plates 5 and the ribbed discharge plates 6, that is to say there is a filtering layer 4 on each side of said plates.

The ribs can assume concentric, spiral or any other arrangement. The concentric arrangement is however the best construction for ready removal.

Figure 2:
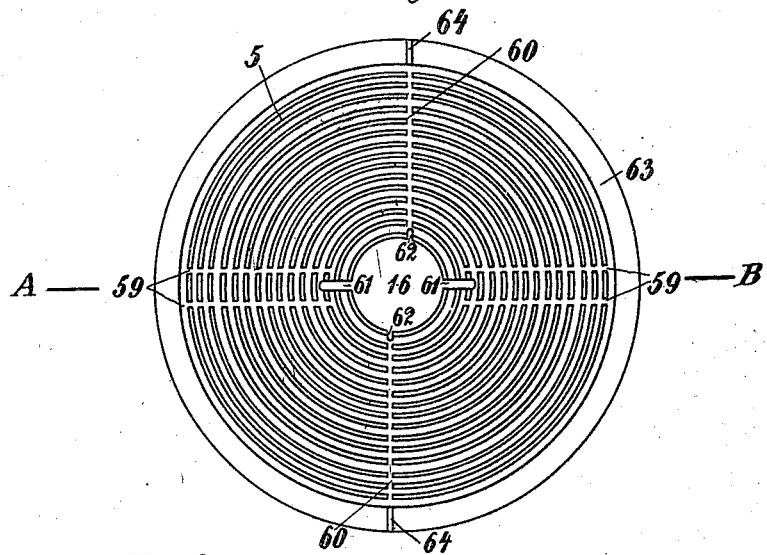
Fig. 2 is an enlarged plan view of one of the inlet plates.
Figure 3:
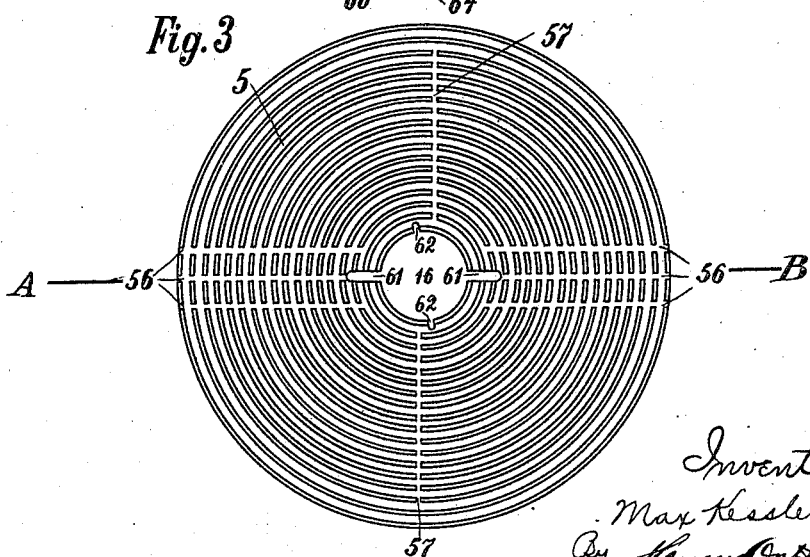
Fig. 3 is a view of the under side of the plate, which in this construction forms the entering side for the liquid to be filtered.

The ribs of the distributing plates 5 have milled through them passages 56 and 57 on the under side (Fig. 3) and passages 59 and 60 on the upper side (Fig. 2.) At the edge of the central opening 16 the plate is notched through at 61 and 62, (Figs. 2 and 3) the latter notches preferably being in line with the line of the air discharge passages 60. The outer edge 63 of the plate shown in Fig. 2 is not ribbed in order to provide a packing surface on the upper face of the plate, and has transversely milled grooves 64 forming air vents, also preferably in line with the passages 60. The total cross section of these vents 64 shall be smaller than the total cross section of the liquid inlet passages 59 of the plate. These grooves and the grooves formed by the ribs do not contain the filtering material. The liquid to be filtered rises under pressure in the peripheral chamber 36 of the filter, (Figure 1), passes through the channels 56 on the under side of the distributing plate 5 and flows over the entire lower surface of this plate, forcing the air ahead of it into the venting channels 57. The air in these channels is vented through the notches 62 and passes through the discharge channels 60 on the upper side of the plate. The excess liquid, not passed through the filtering element passes through channels 56, notches 61 to the upper side of the distributing plate into channels 59 and is distributed between the ribs on this side of the plate forcing the air to the venting channels 60. This air with the air that comes from the under side of the plate through the notches 62 passes from between the distributing plate and filtering element out across the packing surface 63 through the grooves 64, rises through the liquid and is vented from the top of the filter in any well known way. According as the liquid passes through the filtering element, it flows in the manner above indicated to the distributing plates and also drives the collected air and gas bubbles ahead of it through the channels 57, 60 and 64 into the peripheral chamber 36.

At times small quantities of liquid may enter from the peripheral space 36 through the slots 64 into the grooves in the distributing plate but this will do no harm. The main inflow will be through the larger cross sections of channels 56 and 59 in the opposite direction forcing the air to the channels 57, 60 and 64.

A similar operation will be attained when the packing surface 63 is on the under side of the distributing plate 5 and the liquid to be filtered is admitted over the upper face of this plate or when the liquid to be filtered is admitted at the center 16 instead of at the periphery at 36.

Figure 4:
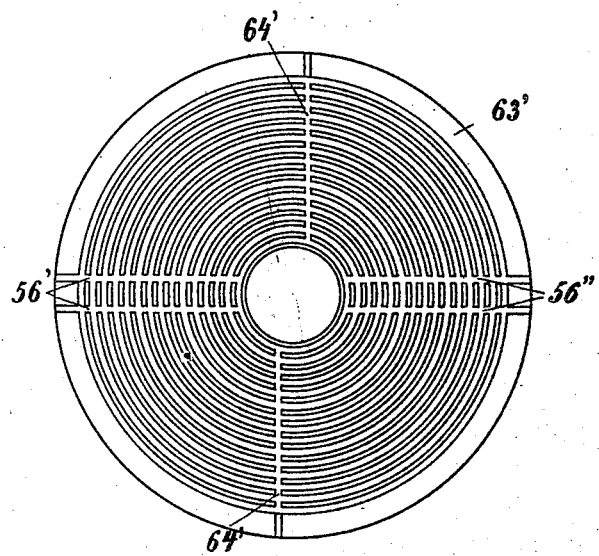
Figs. 4 and 5 show modifications of the arrangement of the channels.

In the latter case the packing surface 63 will be at the center of the plate instead of at the periphery. The venting of the air through the air channel is not dependent upon the conduction of the liquid to be filtered from the under side of the distributing plate to the upper side or vice versa and the action is obtained according to this invention if only one side of the filtering plate is taken as inlet and the filtrate is discharged from the other side or when both sides of the filtering plate operate independently as inlet surfaces. In these two cases, the smooth packing surface 63′ (Fig. 4) provided with inlet grooves 64′ is on the inlet side of the plate and the inlet grooves 56′ and 56″ pass through not only the ribs but also the packing surface 63′. The air forced by the liquid does not then pass on the side of the plate opposite to the entering side thereof, but goes directly through the grooves 64′ in to the peripheral chamber 36.

It is not necessary that the air discharge passages or grooves shall be small or narrower than a single inlet groove or channel if there are several of the latter. The air discharge channels 64′ may have the same area of cross section as a channel 56′, as in this case there are a plurality of inlet channels 56′ and 56″ for each air discharge channel 64′, so that these discharge channels still remain smaller in cross section than the sum of the cross sections of the admission channels for liquid to be filtered.

Figure 5:
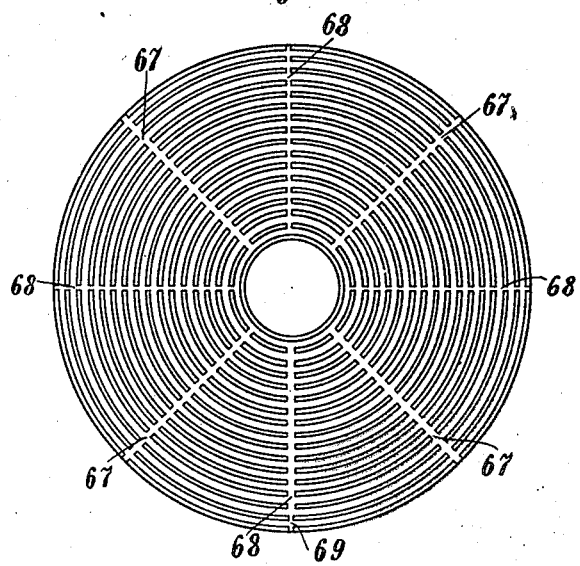

Fig. 5 shows a modified arrangement of distributing plate where the inlet grooves or channels 67 are symmetrically distributed and the air is discharged through similarly arranged radial channels 68, alternating with the channels 67. These air discharge channels may have the same cross section as the inlet channels but in this case should be decreased in area at their discharge ends as at 69, whereby the same result is attained as when these channels are of smaller cross section throughout their length than the inlet channels. In Fig. 5, the wide smooth packing areas 63 or 63′ has been omitted and the ribs extend to the margin of the plate.

I claim:

1. In a filter having filtering layers alternating with inlet distributing plates and discharge collecting plates and in which the liquid to be filtered passes over one or both sides of each distributing plate; the distributing plate having one or more air discharge channels.

2. An inlet distributing plate for filters having a liquid inlet channel on its surface and an air discharge channel of lesser cross section than the inlet channel.

3. An inlet distributing plate for filters of the class described having inlet channels, for the liquid to be filtered and air discharge channels, the sum of the cross sectional areas of the air discharge channels being less than the sum of the cross sectional areas of the liquid supply channels.

4. An inlet distributing plate for filters of the class described having inlet channels for liquid to be filtered, and air discharge channels having a reduced cross sectional area at their discharge ends.

5. An inlet distributing plate for filters of the class described having a non-discharge portion air circulating channels and liquid supply channels on both faces of the plate, and notches through the plate at the non-discharge portion to connect channels of like kind on the opposite faces thereof.

6. An inlet distributing plate having ribbed surfaces and a non-ribbed marginal packing surface on one side and an air discharge channel traversing the ribbed surface and packing surface.

In testimony that I claim the foregoing as my invention, I have signed my name.

MAX KESSLER.

Witness:
KARL ROMOFF.